(12) United States Patent
Chiba et al.

(10) Patent No.: US 7,666,809 B2
(45) Date of Patent: Feb. 23, 2010

(54) ELECTRODE CATALYST FOR FUEL CELL, ELECTRODE FOR FUEL CELL, AND FUEL CELL

(75) Inventors: Takato Chiba, Hachioji (JP); Takayuki Suzuki, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 243 days.

(21) Appl. No.: 11/720,311

(22) PCT Filed: Nov. 17, 2005

(86) PCT No.: PCT/JP2005/021081
§ 371 (c)(1),
(2), (4) Date: May 25, 2007

(87) PCT Pub. No.: WO2006/059485
PCT Pub. Date: Jun. 8, 2006

(65) Prior Publication Data
US 2008/0081760 A1    Apr. 3, 2008

(30) Foreign Application Priority Data
Dec. 1, 2004    (JP)    ............... 2004-348308

(51) Int. Cl.
| *H01M 4/00* | (2006.01) |
| *H01M 4/88* | (2006.01) |
| *C08F 4/02* | (2006.01) |
| *C08F 4/60* | (2006.01) |
| *B01J 31/00* | (2006.01) |
| *B01J 37/00* | (2006.01) |
| *B01J 23/40* | (2006.01) |
| *B01J 23/00* | (2006.01) |
| *B01J 21/18* | (2006.01) |
| *B01J 23/74* | (2006.01) |
| *B01J 23/58* | (2006.01) |
| *B01J 23/72* | (2006.01) |
| *B01J 23/42* | (2006.01) |
| *B01J 23/44* | (2006.01) |

(52) U.S. Cl. ............... 502/101; 502/150; 502/155; 502/162; 502/168; 502/184; 502/185; 502/330; 502/331; 502/339; 429/40; 429/41; 429/42; 429/43; 429/44

(58) Field of Classification Search ............... 502/101, 502/150, 155, 162, 168, 184, 185, 330, 331, 502/339; 429/40–44
See application file for complete search history.

(56) References Cited

U.S. PATENT DOCUMENTS 6,746,793 B1 * 6/2004 Gyoten et al. ............... 429/40

(Continued)

FOREIGN PATENT DOCUMENTS

JP    2000228204    8/2000

(Continued)

OTHER PUBLICATIONS

Search Report for PCT/JP05/21081.*

*Primary Examiner*—Patricia L Hailey
(74) *Attorney, Agent, or Firm*—Lucas & Mercanti, LLP

(57) ABSTRACT

Disclosed is an electrode catalyst for fuel cells, achieving enhanced utilization efficiency of the catalyst. Also disclosed are an electrode for fuel cells by use of the catalyst and a fuel cell. The electrode catalyst for fuel cells is featured in that a compound having at least one functional group and at least one proton-accepting group in the molecule is adsorbed onto a metal catalyst, and the functional group being partially or wholly constituted of a sulfur element or a nitrogen element as its constituent atoms.

12 Claims, 1 Drawing Sheet

U.S. PATENT DOCUMENTS

| | | | |
|---|---|---|---|
| 7,226,690 B2 * | 6/2007 | Sugimasa et al. | 429/40 |
| 2008/0050641 A1 * | 2/2008 | Dressick et al. | 429/42 |
| 2008/0050642 A1 * | 2/2008 | Dressick et al. | 429/42 |

FOREIGN PATENT DOCUMENTS

| | | | |
|---|---|---|---|
| JP | 2003-282078 | * | 10/2003 |
| JP | 2003282078 | | 10/2003 |
| JP | 2000-164535 | * | 6/2006 |
| WO | 2006/090603 | * | 8/2006 |

* cited by examiner

ELECTRODE CATALYST FOR FUEL CELL, ELECTRODE FOR FUEL CELL, AND FUEL CELL

TECHNICAL FIELD

The present invention relates to an electrode catalyst for use in fuel cells, an electrode used for fuel cells and a fuel cell.

TECHNICAL BACKGROUND

Recently, the amount of information dealt with electronic instruments such as personal computers increased dramatically along with the dawn of information-oriented society and electric power consumption of such instruments has markedly increased. Specifically in portable electronic instruments, this increase of electric power consumption has become a major problem for an increased processing capability. Presently in such portable electronic instruments, a lithium battery is generally used as the power supply but energy density of lithium batteries has been pushed to its limit.

In such situations, instead of lithium batteries, the period of continuous use of a portable electronic instrument is expected to be greatly enhanced by the use of fuel cells exhibiting a higher energy density and an enhanced heat exchange rate as a power supply for electronic instruments.

Fuel cells include a solid polymer fuel cell, a phosphoric acid fuel cell, a fused carbonate fuel cell, a solid oxide fuel cell and the like. Of these, the solid polymer fuel cell has advantages of a low operating temperature and a solid electrolyte (thin polymer film). Solid polymer fuel cells are classified mainly into a conversion type polymer fuel cell in which methanol is converted to hydrogen by a converter and a direct methanol polymer fuel cell (DMFC) in which methanol is directly used without using a converter. The DMFC, which needs no converter and can achieve downsizing and weight reduction, is expected to be practically used as a cell used for personal digital assistance (PDA) and the like and also as a dedicated battery toward the coming of ubiquitous society.

The DMFC uses a proton conductive solid polymer membrane as an electrolyte membrane, and generally has a structure in which an anode which is formed of a catalyst coated on porous carbon paper as a diffusion layer and cathode are connected through the electrolyte membrane and an anode-side separator having a channel to supply aqueous methanol solution as a fuel is provided on the anode side, and further, a cathode-side separator having a channel to supply air as an oxidant gas is provided on the cathode side.

When an aqueous methanol solution is supplied to the anode and air is supplied to the cathode, the anode liberates hydrogen ions and electrons concurrently with formation of carbon dioxide gas through the oxidation reaction of methanol and water ($CH_3OH+H_2O_2 \rightarrow CO+6H^++6e$) and the cathode forms water through a reduction reaction of air with the foregoing hydrogen ions which have passed through an electrolyte membrane [$6H+(3/2)O_2+6e^- \rightarrow 3H_2O$], whereby electric energy can be obtained in an external circuit connecting the anode and the cathode. Therefore, the overall reaction of DMFC is the reaction of methanol with oxygen to form water and carbon dioxide.

In general, an anode or a cathode is formed of a metal catalyst such as platinum, conductive carbon such as carbon black or a catalyst bearing carbon, and a polymer electrolyte.

The cost of a platinum catalyst used in an electrode for fuel cells accounts for some tens of % of the total cost, so that reduction of the content of a platinum catalyst is required to reduce cost of such fuel cells.

In conventional methods of preparing a catalyst layer, only 20 to 30% of platinum used in the catalyst layer participates in the electrode reaction, which remains as a problem to be solved for practical use. One reason for this problem is that the catalyst surface causing the decomposition reaction is not close enough to the migration route of produced protons. The migration path is carried by a material containing a proton-accepting group, so that allowing such a material to exist selectively near the catalyst is expected to bring about enhance utilization efficiency of the catalyst.

Proton conduction after reaction takes place only at the three-phase interface in contact with a polymer electrolyte. A fuel is supplied to the three-phase interface, and after reaction, carbon conducts electrons and the polymer electrolyte conducts protons. In conventional methods of preparing a catalyst layer, however, the proportion of a polymer electrolyte existing around the platinum catalyst is relatively small, which renders it difficult to achieve prompt material transfer.

To enhance utilization efficiency of the catalyst, there is disclosed a technique in which a core/shell type catalyst metal comprised of a core of a catalyst metal covered with a catalyst metal different from the core is used and at least 50% by mass of the total catalyst metal amount is accounted for by a catalyst metal carried on the surface of carbon particles in contact with the proton conduction route of a polymer electrolyte (as described in, for example, Patent document 1); a technique of using a carbon containing an organic group capable of dissociating hydrogen ions, such as a sulfonic acid group (as described in, for example, Patent document 2); and an electrode catalyst bearing a catalyst in a carbon material containing at least one ionic functional group on the surface of primary particles of carbon black (as described in, for example, Patent document 3).

There is also disclosed a technique in which to bring a polymer catalyst into sufficient and homogeneous contact with a catalyst to increase the internal reaction area of an electrode, the molecular length of a hydrogen ion-conductive polymer electrolyte is limited to 30-200 nm and when mixing such a polymer electrolyte with a catalyst-bearing carbon through a solvent, it is essential to choose a solvent exhibiting an appropriate dielectric constant (as described in, for example, Patent document 4).

There is also disclosed a technique in which a molecule containing an ion-conductive functional group, capable of functioning as an electrolyte is chemically bonded onto the surface chosen from catalyst particles, other particles and a porous membrane (as disclosed in, for example, Patent document 5).

There is also disclosed a grafted platinum-bearing catalyst as a technique to enhance the utilization efficiency of a platinum catalyst, in which a monomer is allowed to react on the carbon surface and chemically bonded thereto, whereby an electrolyte polymer is fixed on the carbon surface (as described in, for example, Literature 1).

However, the foregoing techniques do not always produce a proton migration route close enough to the vicinity of a catalyst, resulting in little gain in enhancement of efficiency. Accordingly, there is desired development of an electrode exhibiting an enhanced catalyst utilization efficiency in which a proton conduction route is effectively prepared.

Patent document 1: JP-A No. 2001-118582 (hereinafter, the term JP-A refers to Japanese Patent Application Publication)

Patent document 2: JP-A No. 2004-7 Patent document 3: JP-A No. 2004-2 Patent document 4: JP-A No. 2002-6 Patent document 5: JP-A No. 2004-17 Literature 1: Jisedai Nenryodenchi no Gijutsuhokokukai Youshishu (Heisei 15. 12. 14) Dokuritsu Gyouseihojin Sangyogijutsu Sogoukaihatsukikou Nenryodenchi•Suiso Gijutsu Kaihatsubu

DISCLOSURE OF THE INVENTION

Problem to be Solved

In view of the foregoing problems, the present invention has come into being, therefore, it is an object of the invention to provide an electrode catalyst to be used in fuel cells, achieving enhanced utilization efficiency of the catalyst, an electrode for fuel cells by use of the catalyst and a fuel cell.

Means for Solving the Subject

The object of the invention can be realized by the following constitution:

1. An electrode catalyst for fuel cells, wherein the electrode catalyst is a metal catalyst onto which is adsorbed a compound having in the molecule at least one functional group which is partially or wholly constituted of a sulfur element or a nitrogen element as constituent atoms and at least one proton-accepting group;

2. The electrode catalyst described in the foregoing 1, wherein the compound having in the molecule at least one functional group which is partially or wholly constituted of a sulfur element or a nitrogen element as a constituent atom and at least one proton-accepting group is represented by the following formula (1):

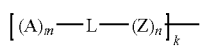

formula (1)

wherein Z represents the functional group which is partially or wholly constituted of a sulfur element or a nitrogen element as a constituent atom, L represents a linkage group having a valence of (m+n), A represents the proton-accepting group, k represents a valence number of the foregoing Z, provided that when k is not 1, A, L and m each may be the same or different, m and n are each an integer of 1 to 5, provided that when m or n is not 1, A or Z may be the same or different;

3. The electrode catalyst described in the foregoing 1, wherein the compound having in the molecule at least one functional group which is partially or wholly constituted of a sulfur element or a nitrogen element as a constituent atom and at least one proton-accepting group is represented by the following formula (2) or (3):

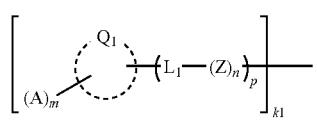

formula (2)

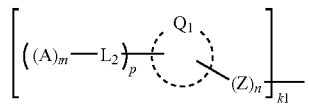

formula (3)

wherein A, Z, m and n are each the same as defined in the foregoing formula (1), $Q_1$ represents a cyclic group, $L_1$ represents a linkage group having a valence of (n+1), $L_2$ represents a linkage group having a valence of (m+1), p is an integer of 1 to 10 and k1 is a valence number of Z, provided that when k1 is not 1, A, $L_1$, $Q_1$ and m are each the same or different;

4. The electrode catalyst described in the foregoing 1, wherein the compound having in the molecule at least one functional group which is partially or wholly constituted of a sulfur element or a nitrogen element as a constituent atom and at least one proton-accepting group is represented by the following formulas (4) or (5):

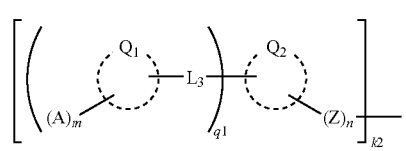

formula (4)

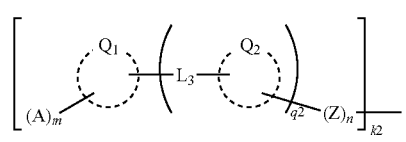

formula (5)

wherein A, Z, m, n and $Q_1$ are each the same as defined in the formulas (2) and (3), $L_3$ is a bond or a bivalent linkage group, $Q_2$ is the same as defined in $Q_1$ of the formula (2), q1 represents a valence number of a cyclic group represented by $Q_2$, q2 represents a valence number of a cyclic group represented by $Q_1$, and k2 represents a valence number of Z, provided that when k2 is not 1, A, $L_3$, $Q_1$, $Q_2$, m, q1 and q2 are each the same or different;

5. The electrode catalyst described in any of the foregoing 2 to 4, wherein in the formulas (1) to (5), Z represents Ra—S—, Ra—S—S—, HS— or (Rb)(Rc)N—, in which Ra represents an alkyl group, a cycloalkyl group, an aralkyl group, an aryl group or a heterocyclic group; Rb and Rc each represent a hydrogen atom, an alkyl group, a cycloalkyl group, an aralkyl group, an aryl group or a heterocyclic group;

6. The electrode catalyst described in any of the foregoing 2 to 5, wherein in the formulas (1) to (5), A represents a carboxy group, a phosphoric acid group, a phosphorous acid group or a sulfonic acid group;

7. The electrode catalyst described in any of the foregoing 1 to 6, wherein the metal catalyst comprises at least one element selected from the group consisting of platinum, gold, silver, copper and ruthenium;

8. The electrode catalyst described in any of the foregoing 1 to 6, wherein the metal catalyst comprises platinum and at least one element selected from the group consisting of gold, silver and copper;

9. The electrode catalyst described in any of the foregoing 1 to 6, wherein the metal catalyst comprises platinum, ruthenium and at least one element selected from the group consisting of gold, silver and copper;

10. The electrode catalyst described in any of the foregoing 1 to 6, wherein the metal catalyst is gold or gold which is adsorbed onto other metals;

11. An electrode for a fuel cell, wherein the electrode uses an electrode catalyst for a fuel cell described in any of the foregoing 1 to 10;

12. A fuel cell, wherein the fuel cell uses an electrode for a fuel cell described in the foregoing 11.

Effect of the Invention

According to the invention, there was provided an electrode catalyst for use in fuel cells, achieving enhance utilization efficiency of the catalyst and an electrode for fuel cells was prepared by use of the catalyst, whereby there was provided a fuel cell exhibiting superior current-voltage characteristics.

EXPLANATION OF NUMERAL

Figure 1:
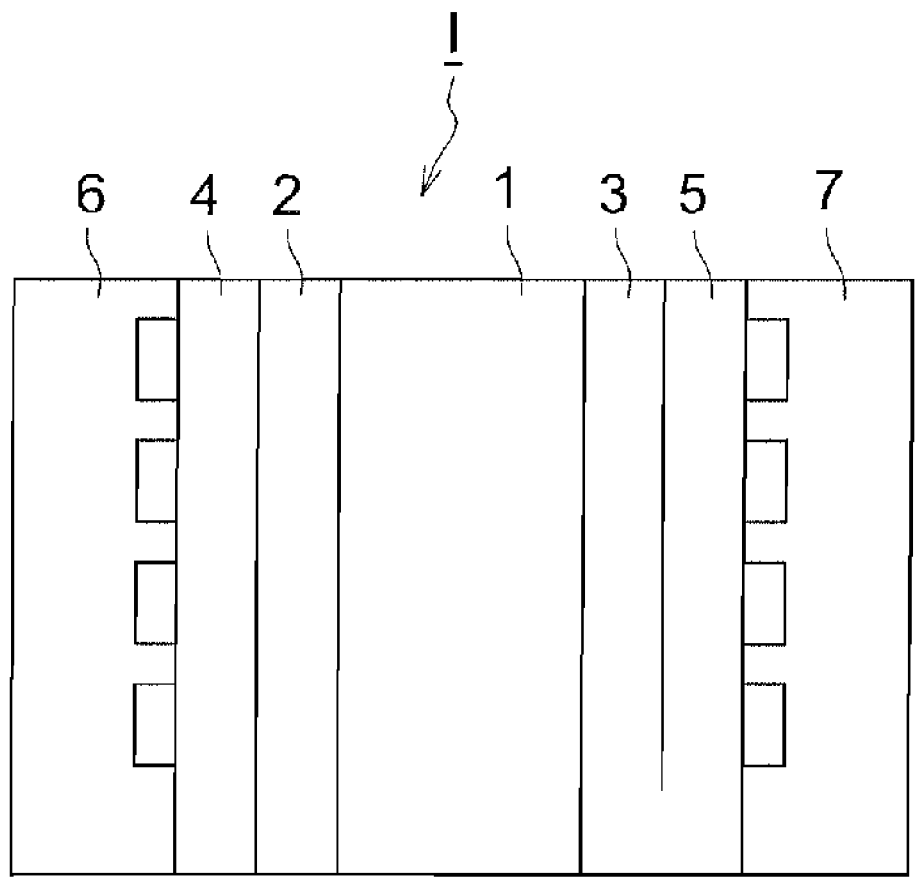
FIG. 1 illustrates an example of a unit cell of a fuel cell of the invention.

I: unit cell of a fuel cell
1: solid polymer electrolyte membrane
2: anode-side catalyst layer
3: cathode-side catalyst layer
4, 5: diffusion layer
6, 7: separator

PREFERRED EMBODIMENTS OF THE INVENTION

One aspect of the invention is that the electrode catalyst for fuel cells is a metal catalyst onto which is adsorbed a compound having at least one functional group comprising a sulfur element or a nitrogen element as a part or all of constituent atoms and at least one proton-accepting group in the molecule. The compound having at least one functional group comprising a sulfur element or a nitrogen element as a part or all of constituent atoms and at least one proton-accepting group in the molecule is preferably a compound represented by formulas (1) to (5), as described above.

The invention will be further described below.

In the formulas (1) to (5), examples of a functional group represented by Z, comprising a sulfur element as a part or all of constituent atoms include a group comprised of a sulfur element and other elements, e.g., a mercapto group, a sulfon group, a sulfide group such as a monosulfide group, a disulfide group or a trisulfide group (in which the sulfur straight chain group may form a sulfur straight chain derivative such as methylthiobenzyl, naphthyltrithiopropyl, or benzothiazolyldithiobutyl); and a cyclic group such as a carbocyclic or heterocyclic group which is substituted by a group comprised of a sulfur element, e.g., mercaptophenyl, thioureidophenyl, phenyldithiobenzothiazolyl, 2-mercaptoimidazolyl, 2-mercaptopyrimidinyl, mercaptotetrazolyl, mercaptotriazolyl, mercaptothiazolyl, 1(2H)-2-thioxopyridyl, 5-mercaptothienyl, 4-thioureidophenyl and 2-thioacetylpyridyl.

Examples of a functional group comprising a nitrogen element as a part or a whole of constituting atoms include an amino group (which may be substituted, such as a substituted amino group, e.g., N-methyl-n-benzylamino, N-acetylamino, hydroxyamino, methoxyamino or benzothiazolylamino); and a cyclic group such as a carbocyclic or heterocyclic group which is substituted by a group comprised of a nitrogen element, e.g., 4-aminophenyl, 4-carboxymethylaminophenyl, methylaminobenzothiazolyl, 2-aminoimidazolyl, 2-ethylaminopyrimidinyl, aminotetrazolyl, methylaminotriazolyl, aminothiazolyl, 1(2H)-2-iminopyridyl, and 5-dimethylaminothienyl.

Examples of a proton-accepting group, represented by A include an anionic group, e.g., —O anion (olato), —S anion (thiolato), —COO anion (carboxylate), —SO$_3$ anion (sulfonato), —SO$_2$ anion (sulfinato), —PO$_3$H anion (phosphonato) and —OPO$_2$H anion (phosphite).

Examples of a polyvalent linkage group, represented by L, $L_1$ or $L_2$ include a non-cyclic hydrocarbon chain group, including one in which a part of carbon atoms is substituted by a hetero atom (e.g., methylene, ethylene, 1,3-propylene, 1,3-butylene, 3,6-dioxaoctane-1.8-diyl, 1,10-decylene, 1,3, 5-pentanetoltl, 1,4,6,8-octanetetrayl); a cyclic hydrocarbon chain group, including one in which a part of carbon atoms is substituted by a hetero atom (e.g., 1,3-cyclopentylene, 3-cyclhexene-1,3,5-triyl, 2,5-cyclohexanediene-1,4-ylene, 1,4-dithia^1,2,3,4-tetrahydronaphthalene-5,8-diyl), aromatic ring group (e.g., benzene-1,2-diyl, benzene-1,3,5-triyl, naphthalene-1,4,6,8-tetrayl), a hetero-aromatic ring group (e.g., pyrrole-1,3-diyl, pyrimidine-1,4-diyl, pyridine-2,4-6, triyl, quinoline-2,4,7-triyl). Examples of a bivalent linkage group, represented by $L_3$ include bivalent groups exemplified in $L_1$ and $L_2$. These linkage groups may be substituted at any position by a substituent. Examples of such a substituent include an alkyl group (e.g., methyl, ethyl, butyl, iso-butyl), an aryl group (including monocycle and polycycle, e.g., phenyl, carboxtphenyl, p-tolyl, p-butylphenyl, naphthyl), a heterocyclic group (e.g., tetrahydrofuryl, 2-pyrrodinone-1-yl, thienyl, furyl, pyridyl, carbazolyl, pyrroryl, ondolyl), a halogen atom (e.g., fluorine atom, chlorine atom, bromine atom), a vinyl group, a trifluoromethyl group, an alkoxy group (e.g., methoxy, ethoxy, methoxyethoxy), an aryloxy group (e.g., phenoxy, p-tolyloxy), a sulfonyl group (e.g., methanesulfonyl, p-toluenesulfonyl), an alkoxycarbonyl group (e.g., ethoxycarbonyl, butoxycarbonyl), an amino group (e.g., amino, biscarboxy-methylamino), an acyl group (e.g., acetyl, benzoyl), an ureido group (e.g., ureido, 3-methylureido, 3-phenylureido), a thioureido group (e.g., thioureido, 3-methylthioureido), an alkylthio group (e.g., methylthio, ethylthio), an arylthio group (e.g., phenylthio), a hydroxy group, and styryl group. Further, these linkage groups may be linked to the groups of Z and A via a group having a bivalent heteroatom at the linkage position [e.g., —O—, —S—, —SS—, —N(R)—, —SO—, —SO$_2$—, —CO—, —CS—, —COO—, —N(R)CO—, —CON(R)—, —N(R)CON(R)—, —SO$_2$N(R)—, —N(R)SO$_2$—].

In the foregoing, R is a hydrogen atom, an alkyl group (e.g., methyl, ethyl), a cycloalkyl group (e.g., cyclopropyl, phenethyl, p-methoxyphenylmethyl, o-acetylaminophenylethyl), a substituted or unsubstituted aryl group (e.g., phenyl, m-methoxyphenyl, 2-naphthyl, 1-naphthyl, o-tolyl, o-methoxyphenyl, m-chlorophenyl, m-bromophenyl, p-tolyl, p-ethoxyphenyl), a substituted or unsubstituted heterocycli group (e.g., 2-furyl, 5-methyl-2-furyl, 2-thienyl, 2-imidazolyl, 2-methyl-1-imidazolyl, 4-phenyl-2-thiazolyl, 5-hydroxy-2-benzothiazolyl, 2-pyridyl, 1-pyrroly) or an acyl group (e.g., acetyl, benzoyl).

Examples of a cyclic group represented by $Q_1$ and $Q_2$ include a saturated or unsaturated carbocyclic group (e.g., cyclopropane, cyclopentane, cyclohexane, cyclooctane, spirodecane, spirododecane, bicyclo[2,2,1]heptane, cyclohexane, perhydronaphthalene), an aromatic carbocyclic group (e.g., aromatic cycle group such as benzene, naphthalene, tetrahydronaphthalene, anthracene, or phenanthrene), a heterocyclic group (e.g., pyrrole, tetrahydropyrrole, imidazole, pyrrolidine, tetrazole, triazole, thiadiazole, thiazolidine, pyridine, thiophene, tetrahydrobenzothiophene, benzothiophene, benzofuran, benzoxazole, tetrahydrobenzoxazole, naphthoxazole, benzonaphthoxazole, benzothiazole, tetrahydrobenzothiazole, naphthothiazole, benzonaphthothiazole, thienothiazole, thianaphthenothiazole, pyridothiazole, benzoselenazole, tetrahydrobenzoselenazole, naphthoselenazole, benzonaphthoselenazole, quinoline, 3,3-dialkylindorenine, 3,3-dialkylpyridopyrroline). These cyclic groups may be substituted at any position by a substituent described as a substituent for L, $L_1$, $L_2$ and $L_3$.

In the compounds of the foregoing formulas (1) to (5), the functional group comprising a sulfur element or a nitrogen element as a part or all of constituent atoms is preferably a Ra—S—, a Ra—S—S— HS— or a (Rb)(Rc)N— group, in which Ra, Rb and Rc are each an alkyl group, a cycloalkyl group, an aralkyl group, an aryl group or a heterocyclic group and specific examples thereof are the same as defined in R of linkage groups $L_1$, $L_2$ and $L_3$ of the formulas (1) to (5).

Specific examples of compounds represented by the formulas (1) to (5) are shown below but are by no means limited to these compounds.

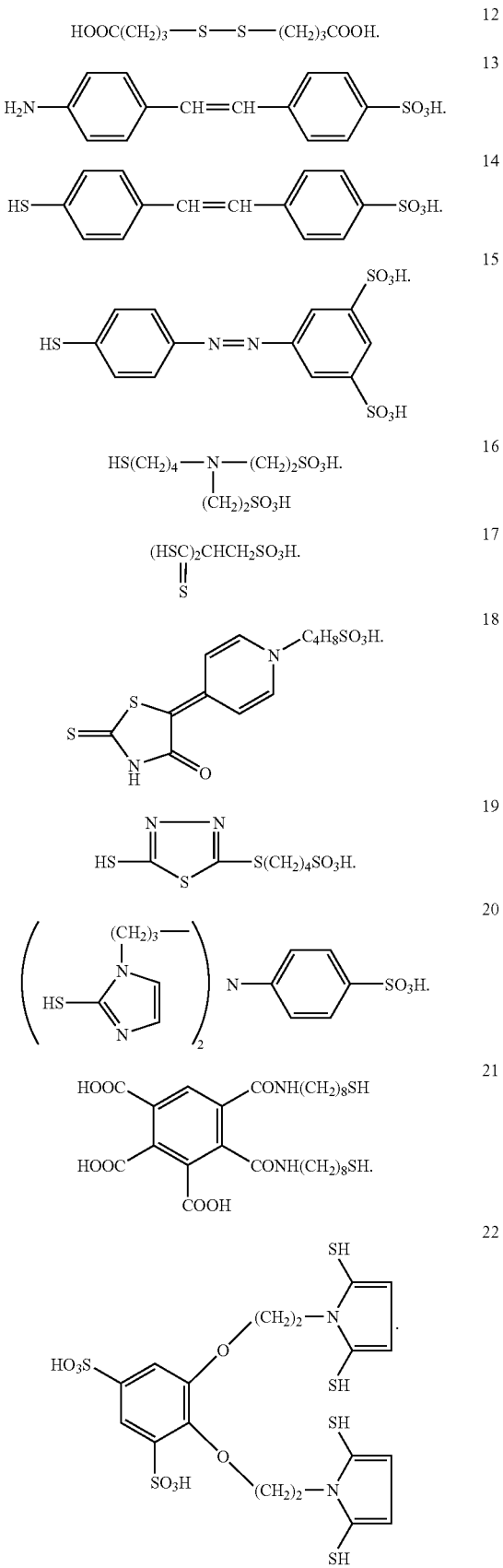

-continued
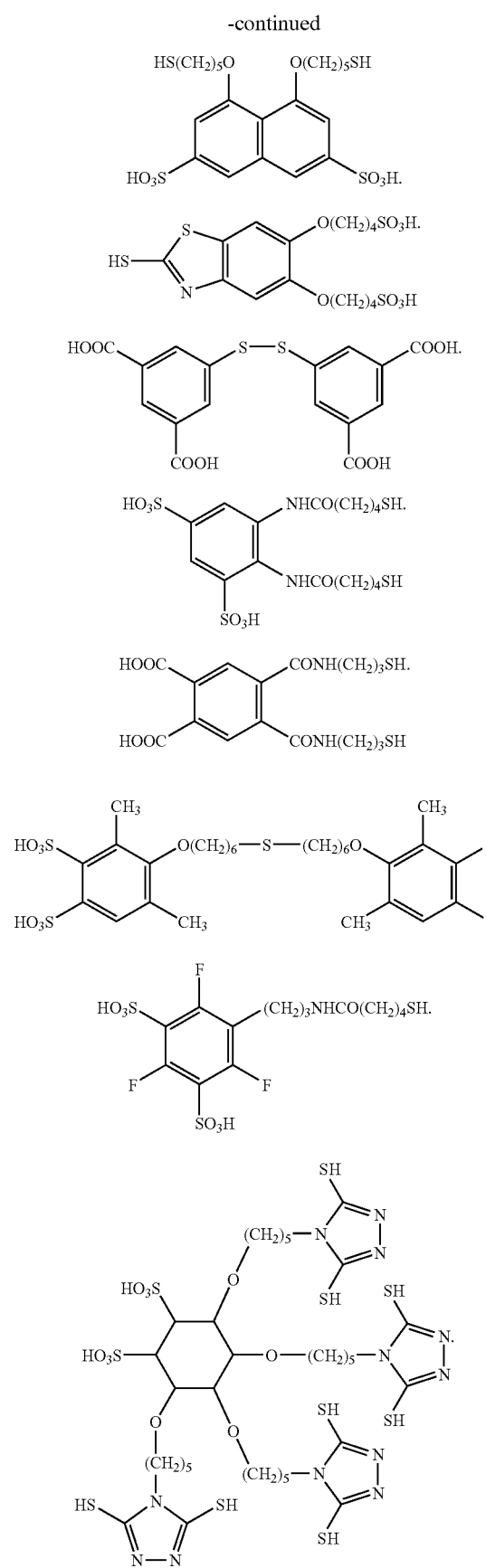
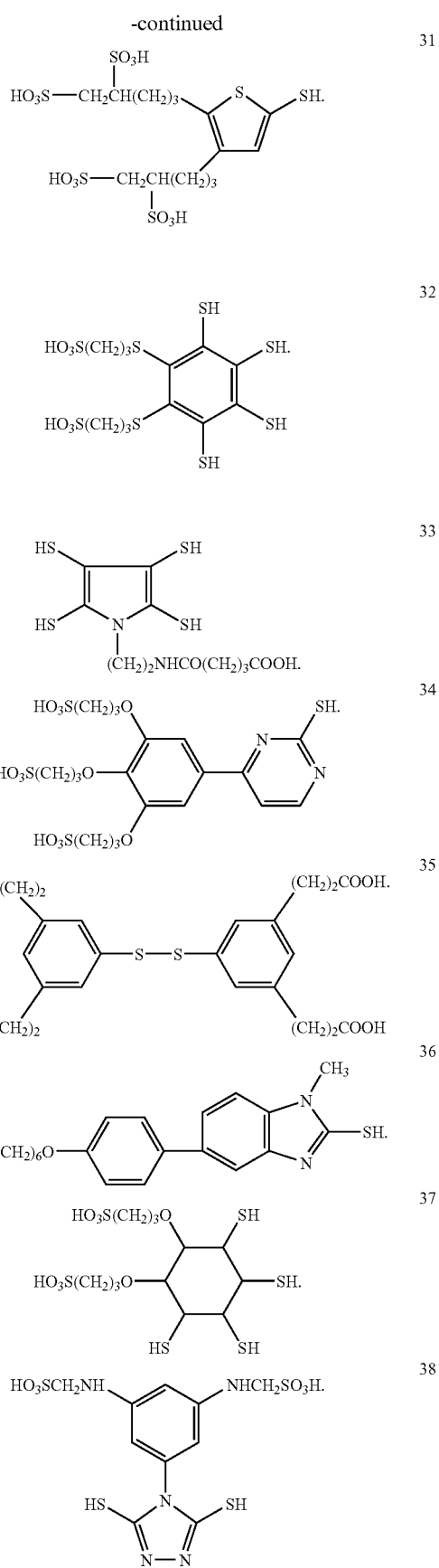

-continued

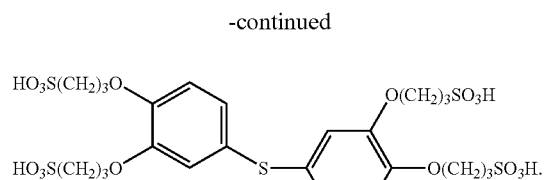
39

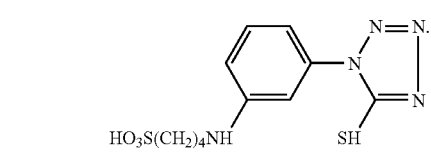
40

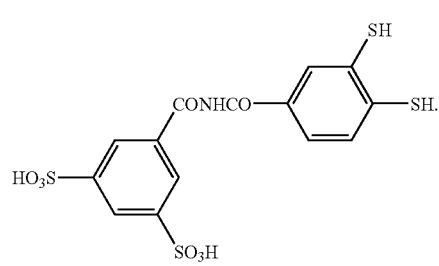
41

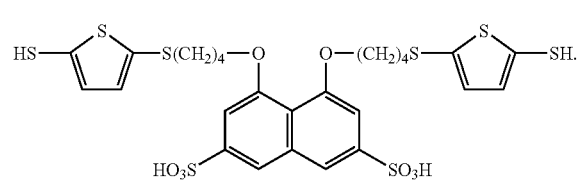
42

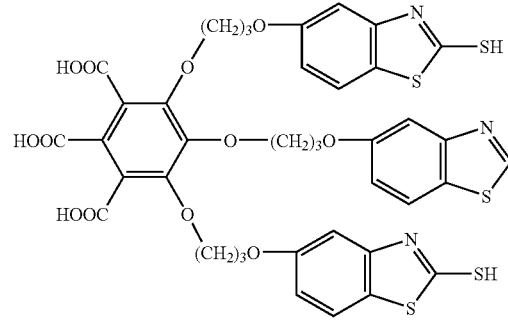
43

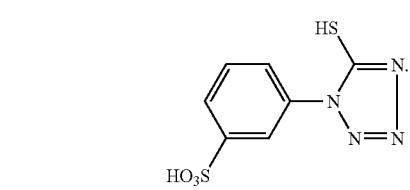
44

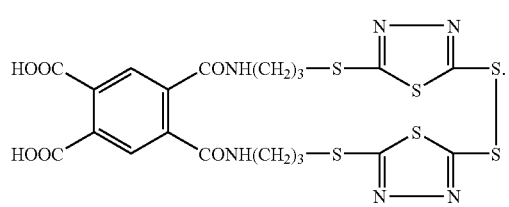
45

-continued

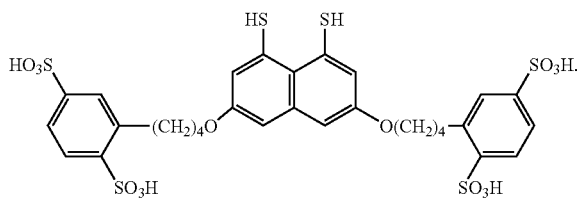
46

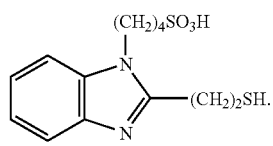
47

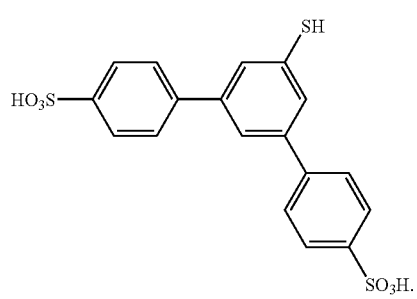
48

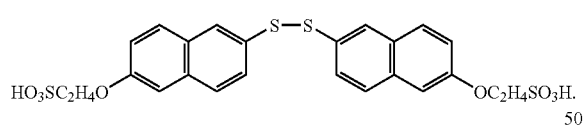
49

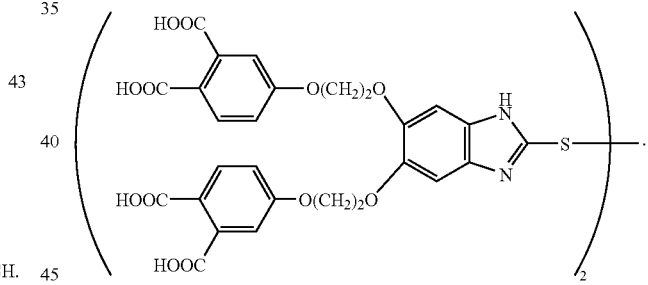
50

HO$_3$S(CH$_2$)$_4$NHCONH(CH$_2$)$_3$SH.
51

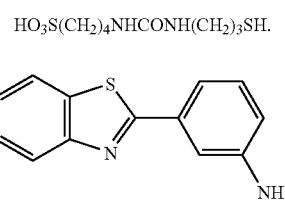
52

The embodiments of a fuel cell of the invention will be described with reference to drawings.

FIG. 1 illustrates an examples of a unit cell of a fuel cell of the invention. In unit cell 1 of a fuel cell, a solid polymer electrolyte membrane 1 is disposed between an anode side catalyst layer 2 and a cathode side catalyst layer 3. The anode side catalyst layer 2 and the cathode side catalyst layer 3 are each provided on a diffusion layer 4 or 5 formed of a porous-conductive sheet such as carbon paper. Hereinafter, the diffusion layer 4 and the anode side catalyst layer 2 provided thereon inclusive is designated as an anode electrode and the diffusion layer 5 and the cathode side catalyst layer 3 provided thereon inclusive is designated as a cathode electrode.

At least one of the anode side catalyst layer 2 and the cathode side catalyst layer 3 essentially contains a catalyst or catalyst bearing carbon. In the invention, the anode side catalyst layer 2 and the cathode side catalyst layer 3 both preferably contain a catalyst or catalyst bearing carbon.

Examples of metal catalysts usable as the electrode catalyst for the fuel cell of the invention include platinum, ruthenium, rhodium, palladium, iridium, gold, silver, copper, cobalt, nickel, chromium, tungsten, manganese, vanadium, molybdenum oxide, and their multi-elemental alloys. A preferred metal catalyst used in the invention is at least one selected from platinum, gold, silver, copper and ruthenium, and platinum and at least one selected from gold, silver and copper, and more preferably, platinum, ruthenium and at least one selected from gold, silver and copper. Gold or gold adsorbed onto other metals is specifically preferred.

In the invention, these metal catalysts are carried by particulate carbon and the thus obtained carbon carrying metal catalysts can be used.

Preferred examples of particulate carbon capable of carrying a metal catalyst include activated carbon, carbon black, graphite and a mixture thereof. Specific examples of carbon black include acetylene black, ketjen black, furnace black, lamp black and thermal black, and ketjen black is specifically preferred. Examples of commercially available carbon black include Denka Black (produced by Denki Kagaku Kogyo Co., Ltd.), Valcan XC-72 (produced by Cabot Co.), Black Pearl 2000 (produced by Cabot Co.), and Ketjen Black EC300J (Ketjen Black International Co.). Hydrophilized particulate carbon may also be used. Specifically, carboxylated carbon, modified with a compound containing a carboxy group and a sulfonated carbon, modified with a compound containing sulfonic acid group are preferred.

A metal catalyst can be carried onto carbon particles, for example, in such a manner that a salt of a metal catalyst such as platinum or ruthenium is added to a carbon black dispersion and is then reduced using hydrazine or the like, followed by being filtered and dried. After being dried, a thermal treatment may be conducted. There may be used a platinum or platinum-ruthenium catalyst carried by commercially available carbon particles, Valcan XC-72 (produced by Tanaka Kikinzoku Co., Ltd.).

An electrode for fuel cells, used in the invention preferably contains a polymer electrolyte in addition to a catalyst-carrying carbon. As a polymer electrolyte is usable any electrolyte exhibiting ionic conductivity, such as those used in a proton conductive polymer electrolyte membrane, and examples thereof include a fluorinated electrolyte, a partially fluorinated electrolyte and a hydrocarbon electrolyte. There are cited, for example, ion-exchange resins having a skeleton of an organic fluorinated polymer, such as perfluorocarbon sulfonic acid resin. As a commercially available perfluorocarbon sulfonic acid resin are cited DE520, DE521 and DE1021 (produced by Du Pont Co.). There are further cited sulfonated plastic resin electrolytes such as sulfonated polyether ketone, sulfonated polyether sulfone, sulfonated polyether ether sulfone, sulfonated polysulfone, sulfonated polysulfide and sulfonated polyphenylene; and sulfoalkylated plastic resin electrolytes such as sulfoalkylated polyether ether ketone, sulfoalkylated polyether sulfone, sulfoalkylated polyether ether sulfone, sulfoalkylated polysulfone, sulfoalkylated polysulfide, and sulfoalkylated polyphenylene.

The ratio of carbon carrying metal catalyst to polymer electrolyte is to be determined according to electrode characteristics and is not specifically limited. For instance, a ratio by mass of carbon carrying metal catalyst to polymer electrolyte is preferably from 5/95 to 95/5, and more preferably 40/60 to 85/15.

A wide variety of additives may be added to the catalyst layer. Such additives include, for example, a conductive agent to enhance electric conductivity, such as carbon, a polymer binder to enhance binding ability and a water repellency agent to enhance water repellency. Specific examples of a water repellency agent include fluororesins such as polytetrafluoroethylene (PTFE), e.g., Teflon (trade name), tetrafluoroethylene-perfluoroalkylvinyl ether copolymer and tetrafluoroethylene-hexafluoropropylene copolymer.

Diffusion layers 4 and 5, which undergo supply of reaction gas and transfer of electrons to the anode side catalyst layer and the cathode side catalyst layer and deliver of the electrons to a an electrically collective layer, are generally porous and use electron-conductive material. Any material exhibiting low electric resistance and having a function capable of electric collection is usable as a porous electron-conductive material. Mainly, electrically conductive materials are cited, including, for example, a calcined material from polyacrylonitrile, a calcined material from pitch, carbon material such as graphite or expanded graphite, nano-carbon material, stainless steel, molybdenum and titanium.

The form of conductive material is not specifically limited and is usable in the form of fibers or particles. Fibrous conductive inorganic material, for example, inorganic conductive fiber such as carbon fiber is preferred in terms of gas permeability. Such inorganic conductive fibers are usable in a structure of woven fabric or nonwoven fabric. There are cited, for example, carbon paper TGP series and SO series (produced by Toray Co.) and carbon cloth (produced by E-TEK Co. Any woven fabric, such as plain fabric, satin, figure textile and zig-zag woven fabric. In nonwoven fabrics, various methods can be employed, such as a paper making method, a needle punch method, a span bond method, a water-jet punch method and a melt-blow method, which are not specifically limited. Knits may also be used.

As a preferred carbon fiber are used woven fabric obtained by carbonization or graphitization of plain fabric using flame resistant spun yarn; nonwoven fabric obtained by subjecting flame resistant yarn to a nonwoven fabric treatment via a needle-punch method or a water-jet-punch method, followed by being subjected to carbonization or graphitization; and matted nonwoven fabric obtained by a paper-making method using a flame resistant yarn, carbonized yarn or graphitized yarn. The use of nonwoven fabric is specifically preferred in terms of a thin strong fabric. It is also effective to use carbon nano-fibers, as described in JP-A No. 2003-109618.

When using an inorganic conductive fiber comprised of carbon fibers, examples of such a carbon fiber include polyacrylonitrile (PAN) carbon fiber, phenol carbon fiber, pitch carbon fiber and rayon carbon fiber, of which PAN carbon fiber is preferred.

The anode side catalyst layer 2 is coated on the diffusion layer 4 and then subjected to a thermal treatment, whereby an anode electrode is obtained. Similarly, the cathode side catalyst layer 3 is coated on the diffusion layer 5 and then subjected to a thermal treatment, whereby a cathode electrode is obtained.

There can be employed, as a proton-conductive solid polymer electrolyte membrane, commonly known materials, such as a sulfonated polyimide polymer electrolyte membrane, a fluorinated polymer electrolyte membrane, a hydrocarbon polymer electrolyte membrane and a composite material.

Examples of a hydrocarbon polymer electrolyte material include a sulfonated engineering plastic electrolyte, such as sulfonated polyether ketone, sulfonated polyether sulfone, sulfonated polyether ether sulfone, sulfonated polysulfone and sulfonated polysulfide and sulfonated polyphenylene; and a sulfoalkylated engineering plastic electrolyte, such as sulfoalkylated polyether ether ketone, sulfoalkylated polyether sulfone, sulfoalkylated polyether ether sulfone, sulfoalkylated polysulfone, sulfoalkylated polysulfide and sulfoalkylated polyphenylene.

The sulfonic acid equivalent of an electrolyte material, as described above is from 0.2 to 2.0 milli-equivalent per g of dry resin, and preferably from 0.7 to 1.6 milli-equivalent per g of dry resin. A sulfonic acid equivalent of less than 0.7 milli-equivalent per g of dry resin results in increased resistance, while a sulfonic acid equivalent of more than 2.0 milli-equivalent per g of dry resin results in a tendency of increased swelling in water.

The solid polymer electrolyte membrane 1 is sandwiched between an anode and a cathode, an electrolyte solution having the same composition as the solid polymer electrolyte membrane 1 is coated respectively on the anode side catalyst layer 2 and cathode side catalyst layer 3 and hot-pressed, whereby an electrolyte membrane-electrode assembly (MEA) is prepared.

Separator 6 (fuel deliver plate) and separator 7 (oxidant deliver plate) as an electric collector having a fuel channel and an oxidant channel are disposed outside the thus prepared electrolyte membrane-electrode assembly (MEA) to form unit cell I. A plurality of these unit cells (I) are laminated through cooling plates, whereby a fuel cell is constituted. A fuel cell may be composed of a unit cell or in a form in which a separator is not provided and an electric-collecting section is formed by metal plating.

Fuels acceptable in the polymer electrolyte type fuel cell of the invention include hydrogen gas, methanol, ethanol, 1-propanol, dimethyl ether and ammonia, and of these, methanol is preferred. In the invention air is preferably used as a preferable oxidant gas.

EXAMPLES

The present invention will be further described with reference to examples but are by no means limited to these.

Preparation of Catalyst

Preparation of Catalyst 1:

Adsorption of particulate gold to platinum ruthenium black and reduction 0.5 g of platinum ruthenium black (TEC 090110, produced by Tanaka Kikinzoku Co., Ltd.) was mixed with 1000 ml of pure water. Then, 40 ml of an aqueous 1 mol/L chloroauric acid solution was added thereto. An aqueous 2 mol/L sodium citrate solution was further added so as to make a concentration of 100 mmol as a reducing agent. This solution was stirred at 95° C. for 7 hrs. Thereafter, filtration and drying were conducted to obtain gold platinum deposited on ruthenium black.

Preparation of Catalyst 2:

Adsorption of Particulate Gold onto Platinum Ruthenium Bearing Carbon and Reduction Platinum ruthenium bearing carbon catalyst (TEC 81E81, produced by Tanaka Kikinzoku Co., Ltd.) was mixed at an amount of 0.5 g, based on platinum with 1000 ml of pure water. Then, 40 ml of an aqueous 1 mol/L chloroauric acid solution was added thereto. An aqueous 2 mol/L sodium citrate solution was further added so as to make a concentration of 100 mmol as a reducing agent. This solution was stirred at 95° C. for 7 hrs. Thereafter, filtration and drying were conducted to obtain gold deposited on the catalyst.

Preparation of Catalyst 3:

Preparation of Catalyst 1:

Adsorption of Particulate Gold onto Platinum Bearing Carbon and Reduction 0.5 g of platinum ruthenium black (TEC 090110, produced by Tanaka Kikinzoku Co., Ltd.) was mixed with 1000 ml of pure water. Then, 40 ml of an aqueous 1 mol/L chloroauric acid solution was added thereto. An aqueous 2 mol/L sodium citrate solution was further added so as to make a concentration of 100 mmol as a reducing agent. This solution was stirred at 95 ° C. for 7 hrs. Thereafter, filtration and drying were conducted to obtain gold platnium deposited ruthenium black.

Thereafter, filtration and drying were conducted to obtain gold deposited on the catalyst.

Preparation of Modified Catalyst:

Adsorption of Sulfonic Acid Containing Molecule on Catalyst Surface

In 1000 ml of pure water was dispersed 0.4 g of each of the thus prepared catalysts 1, 2 and 3, and a compound related to the invention, as shown in Table 1 was further added at an amount of $1 \times 10^{-4}$ mol/L to allow the compound related to the invention to be adsorbed in the vicinity of a metal catalyst. Non-adsorbed molecules were removed by decantation to obtain a catalyst bearing the adsorbed compound related to the invention.

Preparation of Paste for Electrode

Preparation of Paste for Anode

Catalyst 1 or 2 and a modified catalyst by use of a compound related to the invention, as shown in Table 1, distilled water, a 60 mass % Teflon (trade name) dispersion and a 5 mass % Nafion solution (produced by Aldrich Co.) were mixed so as to have a solid content of 12% solids and homogeneously dispersed by ultrasonic to prepare a paste for anode.

Preparation of Paste for Cathode

Similarly to the preparation of paste for anode, a paste for cathode was prepared, except that catalyst 3 and a modified catalyst by use of a compound related to the invention, as shown in Table 1.

Preparation of Water-Repellent Carbon Paper 0.40 mm thick carbon paper exhibiting a porosity of 75% was immersed into a dispersion of Teflon (trade name, produced by Mitsui Du Pont Fluorochemical Co.) to allow Teflon to be attached onto the surface, whereby water-repellent carbon paper was thus prepared.

Preparation of Membrane/Electrode Assembly (MEA)

There were prepared an anode and a cathode, as shown in Table 1. A paste for an anode was uniformly coated at a platinum amount of 3.0 mg/cm$^2$ on the surface of the above-prepared water-repellent carbon paper and dried under a nitrogen atmosphere at 80° C. for 1 hr. to prepare an anode. Similarly, a paste for a cathode was uniformly coated at a platinum amount of 3.0 mg/cm$^2$ on the surface of the water-repellent carbon paper to prepare a cathode. Subsequently, a Nafion 112 membrane (produced by Du Pont Co.) was sandwiched between the anode and the cathode and hot-pressed, whereby prepare an electrolyte membrane/electrode assembly was prepared.

Evaluation 1

The state that sulfonic acid groups of the compound related to the invention localize on the platinum surface can be confirmed through spot analysis by using an analytical transmission electron microscope (ATEM) provided with a field emission type electron gun. Specifically, after confirming a sample placed on a grid mesh with an attached micro-grid through a transmission image, an electron beam reduced to an aperture of ca. 1 nm was irradiated onto the analysis position and characteristic X-rays generated therefrom was measured by using an energy dispersive X-ray spectrometer (EDS) to compare the S (sulfur) intensity of the spectrum.

It was proved that the platinum surface of a modified catalyst used in each of Examples 1, 2, 3, 4, 5, 11, 12, 13, 14 and 15 exhibited a higher S intensity, as compared to the carbon surface. Further, an S intensity on the surface was detected in Examples 6, 7, 8, 9 and 10 but no S intensity was detected in Comparisons. It was therefore proved that the platinum surface of Examples had a portion at which sulfonic acid groups localized, exhibiting, after preparation of a cell, an ion conductive group density higher than at other portions.

Evaluation 2

Using each of the prepared electrolyte membrane/electrode assemblies, a unit cell of a direct methanol type fuel cell was assembled. Under conditions at a temperature of 60° C., the fuel flow rate of 30 ml/min under atmospheric pressure and an air flow rate of 100 ml/min, a fuel composition was supplied to the anode side and air was supplied to the cathode side, after which current-voltage characteristics were measured. The measurement levels and current values at 0.6 V are shown in Table 1

TABLE 1

| | Anode Modification Molecule No. | Anode bearing Material | Cathode Modification Molecule No. | Cathode Bearing Material | Current Value (A) |
|---|---|---|---|---|---|
| Example 1 | 4 | catalyst 2 | unmodified | catalyst 3 | 0.12 |
| Example 2 | 14 | catalyst 2 | unmodified | catalyst 3 | 0.11 |
| Example 3 | 29 | catalyst 2 | unmodified | catalyst 3 | 0.12 |
| Example 4 | 39 | catalyst 2 | unmodified | catalyst 3 | 0.13 |
| Example 5 | 46 | catalyst 2 | unmodified | catalyst 3 | 0.12 |
| Comparison 1 | unmodified | catalyst 2 | unmodified | catalyst 3 | 0.08 |
| Example 6 | 4 | catalyst 1 | unmodified | catalyst 3 | 0.13 |
| Example 7 | 14 | catalyst 1 | unmodified | catalyst 3 | 0.12 |
| Example 8 | 29 | catalyst 1 | unmodified | catalyst 3 | 0.13 |
| Example 9 | 39 | catalyst 1 | unmodified | catalyst 3 | 0.13 |
| Example 10 | 46 | catalyst 1 | unmodified | catalyst 3 | 0.12 |
| Comparison 2 | unmodified | catalyst 1 | unmodified | catalyst 3 | 0.09 |
| Example 11 | unmodified | catalyst 2 | 4 | catalyst 3 | 0.12 |
| Example 12 | unmodified | catalyst 2 | 14 | catalyst 3 | 0.14 |
| Example 13 | unmodified | catalyst 2 | 29 | catalyst 3 | 0.13 |
| Example 14 | unmodified | catalyst 2 | 39 | catalyst 3 | 0.14 |

TABLE 1-continued

| | Anode Modification Molecule No. | Anode bearing Material | Cathode Modification Molecule No. | Cathode Bearing Material | Current Value (A) |
|---|---|---|---|---|---|
| Example 15 | unmodified | catalyst 2 | 46 | catalyst 3 | 0.12 |
| Example 16 | 39 | catalyst 1 | 29 | catalyst 3 | 0.16 |

As apparent from Table 1, it was proved that fuel cells of the invention exhibited superior current-voltage characteristic, compared to those of comparison.

What is claimed is:

1. An electrode catalyst for fuel cells, wherein the electrode catalyst is a metal catalyst onto which is adsorbed a compound having at least one functional group which comprises a sulfur element or a nitrogen element as a part or all of constituent atoms and at least one proton-accepting group, and the compound is represented by the following formula (1), (2), (3), (4) or (5):

formula (1)

wherein Z represents the functional group which comprises a sulfur element or a nitrogen element as a part or all of constituent atoms, L represents a linkage group having a valence of (m+n), A represents the proton-accepting group, k represents a valence number of Z, provided that when k is not 1, A, L and m each may be the same or different, m and n are each an integer of 1 to 5, provided that when m or n is not 1, A or Z ma be the same or different,

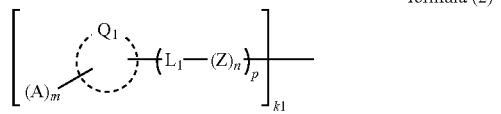

formula (2)

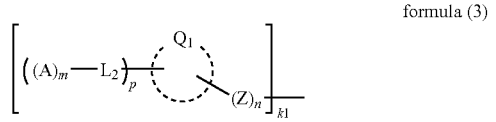

formula (3)

wherein A, Z, m and n are each the same as defined in formula (1), $Q_1$ represents a cyclic group, $L_1$ represents a linkage group having a valence of (n+1), $L_2$ represents a linkage group having a valence of (m+1), p is an integer of 1 to 10 and k1 is a valence number of Z, provided that when k1 is not 1, A, $L_1$, $Q_1$ and m are each the same or different,

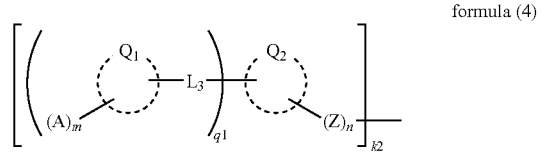

formula (4)

-continued

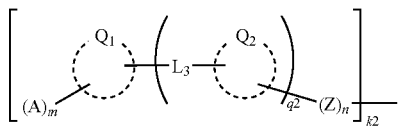

formula (5)

wherein A, Z, m, n and $Q_1$ are each the same as defined in formula (2) or (3), $L_3$ is a bond or a bivalent linkage group, $Q_2$ is the same as defined in $Q_1$ of formula (2), q1 represents a valence number of a cyclic group represented by $Q_2$, $q_2$ represents a valence number of a cyclic group represented by $Q_1$, and k2 represents a valence number of Z, provided that when k2 is not 1, A, $L_3$, $Q_1$, $Q_2$, m, q1 and q2 are each the same or different.

2. The electrode catalyst as claimed in claim 1, wherein the compound is represented by the formula (1).

3. The electrode catalyst as claimed in claim 1, wherein the compound is represented by the formula (2) or (3).

4. The electrode catalyst as claimed in claim 1, wherein the compound is represented by the formula (4) or (5).

5. The electrode catalyst as claimed in claim 1, wherein in formulas (1) to (5), Z represents Ra—S, Ra—S—S—, HS— or (Rb)(Rc)N—, in which Ra represents an alkyl group, a cycloalkyl group, an aralkyl group, an aryl group or a heterocyclic group; Rb and Rc each represent a hydrogen atom, an alkyl group, a cycloalkyl group, an aralkyl group, an aryl group or a heterocyclic group.

6. The electrode catalyst as claimed in claim 1, wherein in formulas (1) to (5), A represents a carboxy group, a phosphoric acid group, a phosphorous acid group or a sulfonic acid group.

7. The electrode catalyst as claimed in claim 1, wherein the metal catalyst comprises at least one element selected from the group consisting of platinum, gold, silver, copper and ruthenium.

8. The electrode catalyst as claimed in claim 1, wherein the metal catalyst comprises platinum and at least one element selected from the group consisting of gold, silver and copper.

9. The electrode catalyst as claimed in claim 1, wherein the metal catalyst comprises platinum, ruthenium and at least one element selected from the group consisting of gold, silver and copper.

10. The electrode catalyst as claimed in claim 1, wherein the metal catalyst is gold or a gold adsorbed onto other metals.

11. An electrode for a fuel cell, wherein the electrode uses an electrode catalyst for a fuel cell as claimed in claims 1.

12. A fuel cell, wherein the fuel cell uses an electrode for a fuel cell as claimed in claim 11.

* * * * *